J. D. BLACK.
FRUIT GRADING OR SIZING MACHINE.
APPLICATION FILED MAR. 7, 1917.
1,245,662.
Patented Nov. 6, 1917.
3 SHEETS—SHEET 2.
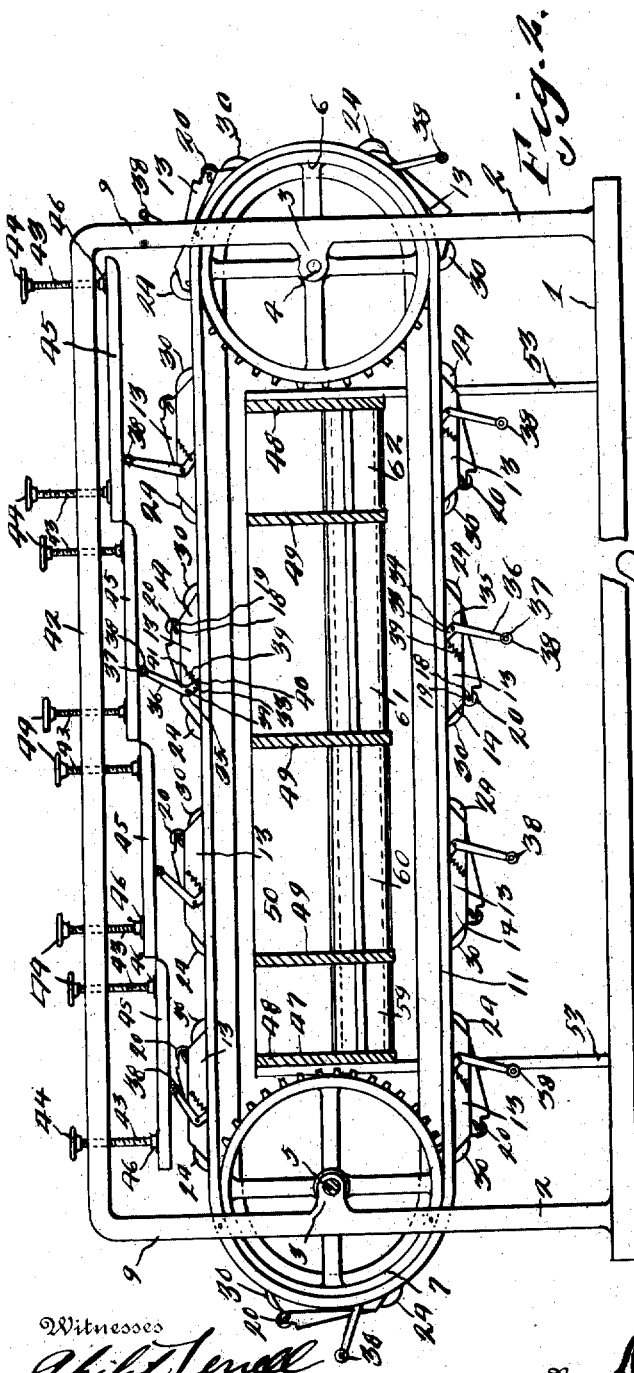
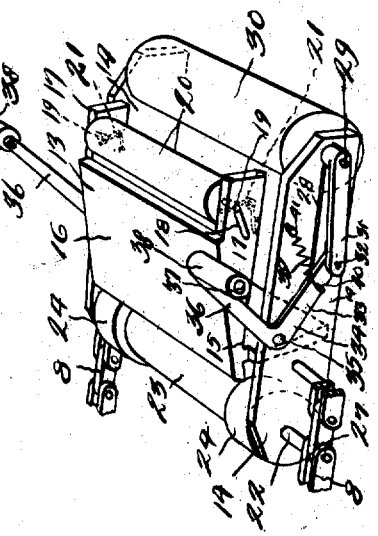
Inventor
J. D. Black
By D. Swift & Co.
his Attorneys
Witnesses

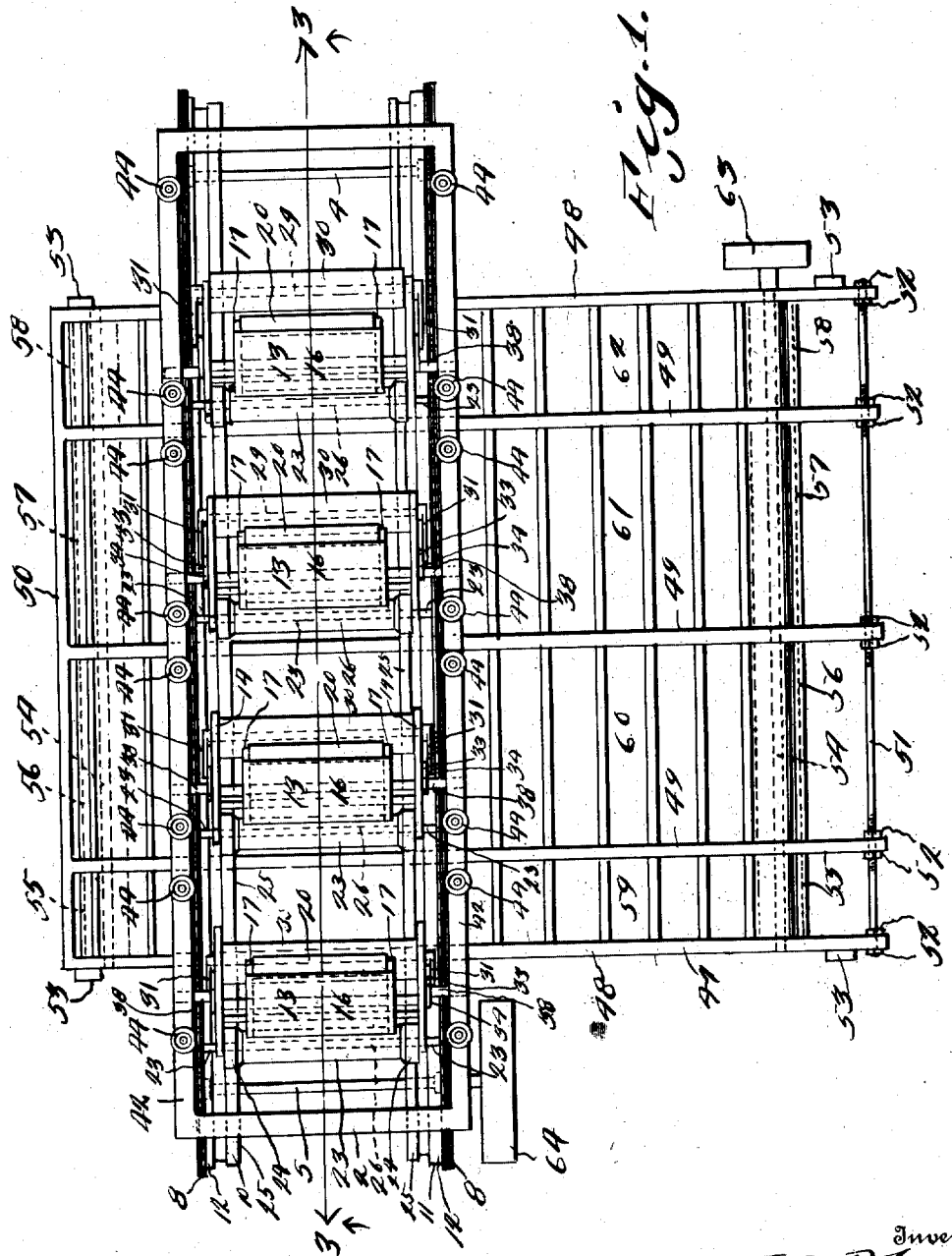

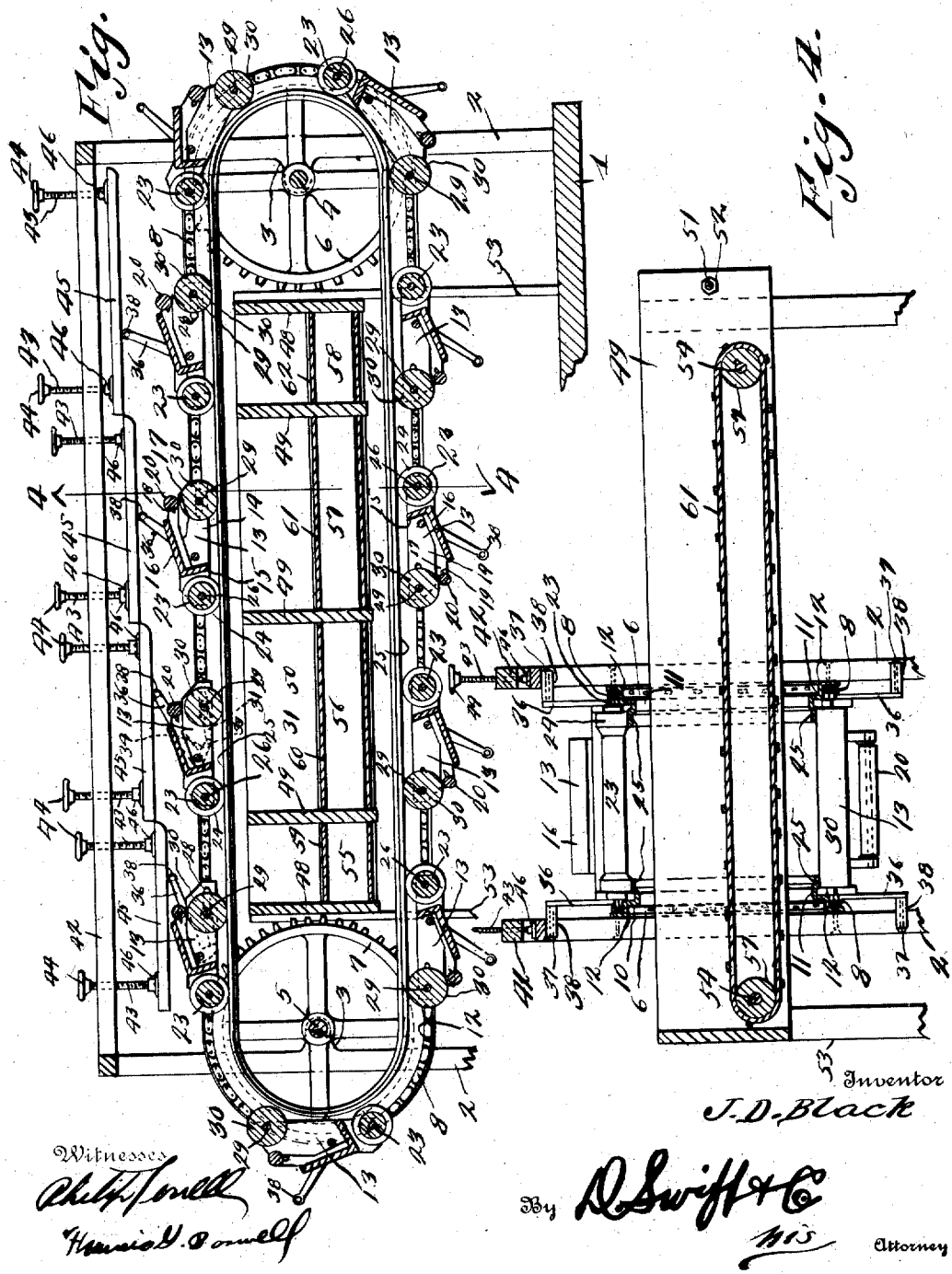

UNITED STATES PATENT OFFICE.

JOHN D. BLACK, OF REDLANDS, CALIFORNIA.

FRUIT GRADING OR SIZING MACHINE.

1,245,662.  Specification of Letters Patent.  Patented Nov. 6, 1917.

Application filed March 7, 1917. Serial No. 153,072.

*To all whom it may concern:*

Be it known that I, JOHN D. BLACK, a citizen of the United States, residing at Redlands, in the county of San Bernardino, State of California, have invented a new and useful Fruit Grading or Sizing Machine; and I do hereby declare the following to be a full, clear, and exact description of the invention, such as will enable others skilled in the art to which it appertains to make and use the same.

This invention relates to a novel type of structure of machine, designed primarily for assorting and grading, or sizing fruit, but is advantageously capable for separating and sizing or grading other products and commodities according to the bulk and weight thereof.

One of the objects of the invention is to provide a simple, effective and practical machine of this kind, whereby the fruit or the like may be separated according to the size thereof.

A further object of the invention is to provide an endless conveyer having fruit holding rollers, and means whereby every other roller may be automatically moved, according to the size of the fruit, whereby the fruit may drop between the rollers on to different conveyers, which are designed for different sized fruits.

A further object of the invention is to provide carriages for said rollers, there being opposing slots in the carriages, the slots in each carriage to receive a roller, and means having link connections with the roller in said slots and adapted to be actuated by means in the fruit path, whereby the different sizes of fruit may be separated.

A further object of the invention is to provide means on each carriage to prevent bruising of the fruit, in case the fruit should tend to climb the roller in front.

In practical fields, the details of construction may necessitate alterations falling within the scope of what is claimed.

The invention comprises further features and combination of parts, as hereinafter set forth, shown in the drawings, and claimed.

In the drawings:—

Figure 1 is a plan view of the improved machine for sizing the fruit.

Fig. 2 is a view in side elevation of the machine.

Fig. 3 is a longitudinal sectional view on line 3—3 of Fig. 1.

Fig. 4 is a sectional view on line 4—4 of Fig. 3.

Fig. 5 is a detail view of one of the carriages.

Referring more especially to the drawings, 1 designates a base, and 2 a frame rising upwardly therefrom. This frame is rectangular, and mounted in bearings 3 of the opposite ends of the frame are the shafts 4 and 5 provided with the sprockets 6 and 7, about which the sprocket chains 8 engage. To the inner faces of the vertical upright parts 9 of the frame, tracks 10 and 11 are secured. These tracks are angular in cross section, as shown, and on the parts 12 of which the chains 8 engage. Carried by the opposite chains, are the carriages 13, which are spaced apart, as shown. Each carriage consists of a frame comprising the side pieces 14, which are connected by the transverse piece 15. Extending rearwardly from each piece 15 is an inclined plate 16, which is braced by the end members 17. The rear portions of the members 17 are extended and have slots 18 for the reception of the pintles 19 of the roller 20. The pintles 19 of the roller 20 are held in the rear upper portions of the slots 18 by means of the springs 21, which are carried on the inner faces of said end members 17. Mounted in bearings of the side pieces 14 of each carriage are the pintles 22 of the forward roller 23, which has the flanged ends 24, which engage and roll upon the surfaces 25 of the tracks 10 and 11. The pintles 22 form parts of the shaft 26, which extend through the roller 23, so that said roller may rotate on the shaft, as the carriages move forwardly. The pintles 22 are secured to the chains 8, as shown at 27.

The side pieces 14 of each carriage, near their other ends, have elongated slots 28, in the rear ends of which the shaft 29 is mounted. A roller 30 is mounted upon the shaft 29 of each carriage, and its end portions engage the surface 25 of the tracks, as the chains move. Connected in any suitable manner to the ends of the shaft 29, are links 31, to which, as at 32, the long arms 33 of the bell crank levers 34 are connected. The bell crank levers 34 are pivoted at 35 forward of the extremities of the links 31, a distance substantially the length of the arms 33. Extending laterally of the short arm 36 of the bell crank levers are pins 37 carrying rollers 38. Springs 39 are connected at 40 to the arms 33, and are in turn secured at 41 to the side pieces 14 of each carriage, thereby so acting or coöperating the said levers 34 as to hold the shaft 29 in or adjacent the rear ends of the slots 28. The carriages are of such width and the levers 34 are so pivoted that the pins 37 will hold their rollers under the upper rails 42 of the frame. Threaded in the upper rails 42 of the frame are screws 43 provided with heads 44 of sufficient size as to permit manual manipulation in the turning of the screws, for adjusting the gage bars 45 toward and from the rollers 38 of the pins 37. These gage bars are connected to the screws 43 by any suitable swivel means, as shown at 46, so that the screws may turn relative to said bars. A suitable frame 47 is provided consisting of the outer sides 48 and the intermediate partitions 49. At one end of the frame 47, the parts 48 and 49 are connected by the strip 50, while the other ends of the parts 48 and 49 are connected by the rod 51 and the nuts 52, which are threaded on the rod upon opposite faces of said parts. This frame 47 is supported upon the legs 53. Mounted in bearings at the opposite ends of the frame 47, are the shafts 54, which support the rollers 55, 56, 57 and 58, respectively, about which the conveyers 59, 60, 61 and 62 travel, in order to carry different sizes of fruit to one side of the machine, according to their relative sizes. One end of one of the shafts 54 has a pulley 63, to which any suitable means may be belted, for imparting movement to said conveyers. One end of the shaft 5 of the fruit separating and sizing machine is provided with a pulley 64, to which any suitable means may be belted for operating the machine. It is to be seen that the gage bars 45 are arranged in pairs, one pair in advance of the other, and so on, toward the end of the machine. In order to separate the fruit, oranges or the like, according to their different sizes, the different pairs of bars 45 are so set or adjusted as to depress the levers 34, to move the rear rollers the necessary distance from the forward roller of each carriage. In other words said bars 45 may be so set to operate the levers 34 as to hold the adjoining rollers of two adjacent carriages as to permit fruit of substantially two and a half inches to pass between the rollers and the corresponding rollers of the succeeding carriages to be separated to permit oranges or the like of three, three and a half, and four inches in diameter to pass therethrough. The oranges or the like of such various diameters fall respectively upon the different conveyers 59, 60, 61 and 62. The rollers 20, which are yieldably mounted, act to avoid excessive bruising of the fruit, when the same is deposited upon the rollers. The upwardly and rearwardly inclined parts 16 act to prevent the fruit from rolling rearwardly and over the rollers 23.

The invention having been set forth, what is claimed as new and useful, is:—

1. In a fruit sizing and separating machine, a conveyer, a carriage carried thereby having a roller at the forward end and a yieldable roller at the rear end, and means on the carriage having connections with the rear roller and adapted to be depressed for adjusting the rear roller.

2. In a fruit sizing and separating machine, an endless conveyer, a plurality of carriages carried thereby, each carriage having a forward roller and a rear slidably mounted roller, automatically slidable with respect to the forward roller of the succeeding carriage, and means designed to be depressed and having yieldable connections with the rear slidable roller for automatically adjusting the same, according to the size of fruit passed between the rear sliding roller and the forward roller of the succeeding carriage.

3. In a fruit sizing and separating machine, an endless conveyer, a plurality of carriages carried thereby, each carriage having a forward roller and a rear slidably mounted roller, automatically slidable with respect to the forward rollers of the succeeding carriage, and means designed to be depressed and having yieldable connections with the rear slidable roller for automatically adjusting the same, according to the size of the fruit passed between the rear sliding roller and the forward roller of the succeeding carriage.

4. In a fruit sizing and separating machine, an endless conveyer, a plurality of carriages carried thereby, each carriage having a forward roller and a rear slidably mounted roller, automatically slidable with respect to the forward rollers of the succeeding carriage, and means designed to be depressed and having yieldable connections with the rear slidable roller for automatically adjusting the same, according to the size of the fruit passed between the rear sliding roller and the forward roller of the succeeding carriage, and a plurality of members individually adjustable for actuating said means of the respective carriages according to the different sizes of fruit.

5. In a fruit sizing and separating machine, an endless conveyer, a plurality of carriages carried thereby, each carriage having a forward roller and a rear slidably mounted roller, automatically slidable with respect to the forward rollers of the succeeding carriage, and means designed to be depressed and having yieldable connections with the rear slidable roller for automatically adjusting the same, according to the size of the fruit passed between the rear sliding roller and the forward roller of the succeeding carriage, and means yieldably mounted on the carriage to prevent bruising of the fruit as it deposits on the rollers of the carriages.

6. In a fruit sizing and separating machine, an endless conveyer, a plurality of carriages carried thereby, each carriage having a forward roller and a rear slidably mounted roller, automatically slidable with respect to the forward rollers of the succeeding carriage, and means designed to be depressed and having yieldable connections with the rear slidable roller for automatically adjusting the same, according to the size of the fruit passed between the rear sliding roller and the forward roller of the succeeding carriage, means yieldably mounted on the carriage to prevent bruising of the fruit as it deposits on the rollers of the carriages, and a plurality of members individually adjustable for actuating said means of the respective carriages according to the different sizes of the fruit.

7. In a fruit sizing and separating machine, a frame, a conveyer mounted thereon, a plurality of carriages on the conveyer, each carriage having a forward roller and a rear slidable mounted roller, automatically slidable with respect to the forward roller of the succeeding carriage, a track for the chains of the conveyer and for said rollers, bell crank levers pivotally mounted upon the sides of the carriages and having yieldable connections with the slidable rollers, spring means for the bell crank levers, a plurality of members arranged in pairs, each pair being individually adjustable for actuating said bell crank levers against the action of the spring means, whereby the sliding roller of each carriage may automatically adjust with respect to the forward roller of the succeeding carriage according to the size of the fruit to pass between said rollers, a plurality of conveyers for carrying the fruit to one side according to the different sizes thereof.

In testimony whereof I have signed my name to this specification in the presence of two subscribing witnesses.

JOHN D. BLACK.

Witnesses:
CATHARINE CREESAN,
EARL D. FINCH.

Copies of this patent may be obtained for five cents each, by addressing the "Commissioner of Patents, Washington, D. C."